March 18, 1941.  E. A. WALKER  2,235,269
MACHINE TOOL WITH FLOATING HEAD
Filed Sept. 14, 1939  2 Sheets-Sheet 2
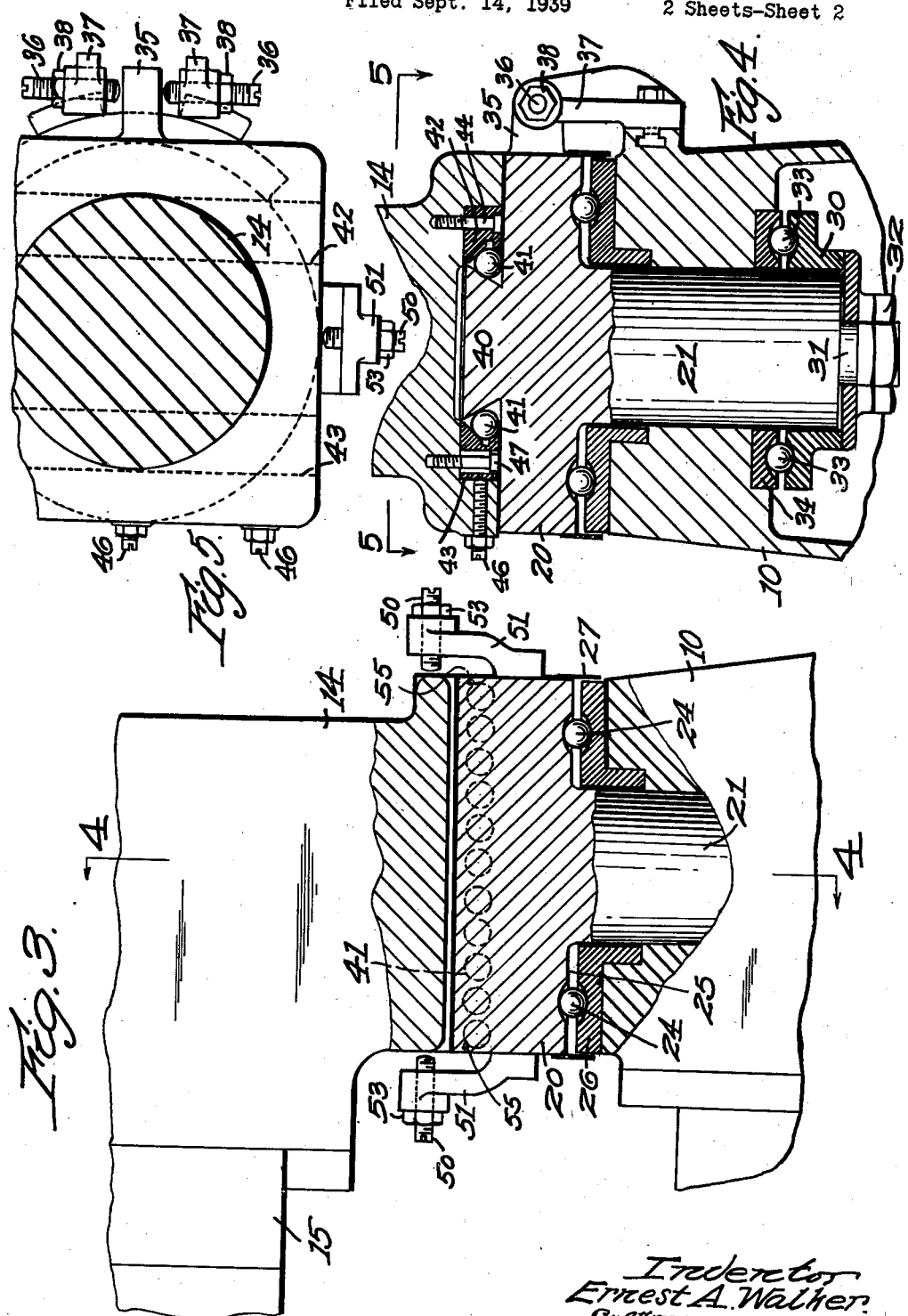
Inventor
Ernest A. Walker
By attorney Patented Mar. 18, 1941

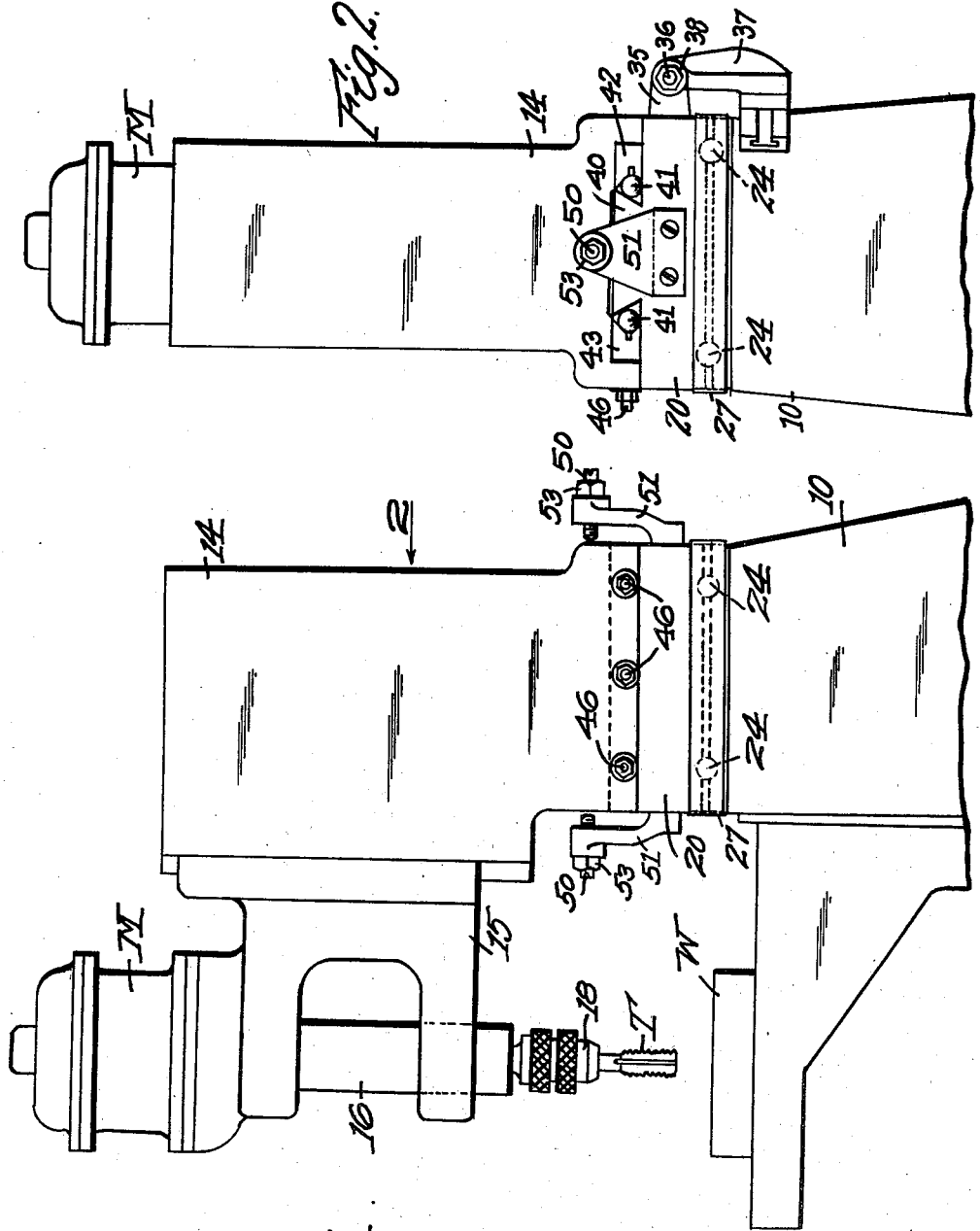

2,235,269

UNITED STATES PATENT OFFICE 2,235,269

MACHINE TOOL WITH FLOATING HEAD

Ernest A. Walker, Worcester, Mass., assignor to John Bath & Company, Worcester, Mass., a corporation of Massachusetts Application September 14, 1939, Serial No. 294,930

6 Claims. (Cl. 10—89)

This invention relates to machine tools and particularly to machine tools used in tapping or reaming operations.

In modern practice, reamed or tapped tools must be held closely to size and must be of uniform diameter throughout their length. Tapered or bell-mouthed holes, as well as over-sized holes, lead to expensive rejections. On the other hand, it is very difficult to secure a tap or reamer absolutely concentric with its driving chuck or spindle or absolutely perpendicular to the plate or table on which the work is supported. Some means permitting relative transverse adjustment of the tool and work is therefore indicated as desirable.

Floating chucks or tool holders have been suggested but have not been particularly satisfactory, as a tool does not shift readily relative to its driving spindle when the tool is under load.

It is the general object of my invention to provide a machine tool with a floating head in which a tool spindle is rotatably mounted in any usual manner. A further feature of the invention relates to the provision of means for limiting transverse movement of the head in at least one direction, and to the further provision of means permitting limited free angular movement of the head about a vertical axis.

My invention further relates to arrangements and combinations of parts which will be hereinafter described and more particularly pointed out in the appended claims.

A preferred form of the invention is shown in the drawings, in which—

Fig. 1 is a partial side elevation of a tapping machine embodying my improvements;

Fig. 2 is a partial rear elevation, looking in the direction of the arrow 2 in Fig. 1;

Fig. 3 is an enlarged partial side elevation, partly in section and showing the floating connections;

Fig. 4 is a partial sectional rear elevation, taken along the line 4—4 in Fig. 3; and Fig. 5 is a sectional plan view, taken along the line 5—5 in Fig. 4.

Referring to the drawings, I have shown parts of a reaming or tapping machine comprising a fixed base 10, a bracket to support the work W, and a head 14 mounted on the base 10 and providing a support for a bearing block 15 in which a tool spindle 16 is mounted for rotation by a concentric motor M.

A tap or other tool T is shown as held in the spindle 16 by a chuck 18, but the tool may be secured in the spindle in any other convenient manner. Any usual provision may be made for relative vertical movement between the tool T and the work W.

The parts thus far described are of usual commercial construction, except for the manner of mounting the head 14 on the base 10. In the usual construction, these parts 10 and 14 are either integral or are rigidly secured together, but in my construction special provision is made to permit the head 14 to float or move horizontally in one or more directions relative to the base 10.

As shown in Figs. 3 and 4, I provide an intermediate rotary bearing member 20, interposed between the base 10 and the head 14, and having a downwardly extended shank portion 21. The member 20 is rotatably supported on a plurality of balls 24, positioned between the outwardly flanged portion 25 of the member 20 and a wear plate or ball race 26 mounted on the base 10. A shield or skirt 27 may be provided to exclude dust or dirt from the bearing.

The shank 21 is also provided at its lower end with a ball race 30 vertically adjustable on a reduced threaded end portion 31 of the shank 21 and secured in adjusted position by a lock nut 32. Balls 33 are interposed between the race 30 and an upper ball race or wear plate 34 fixed in an inner portion of the base 10.

By the provision of upper and lower ball bearings as shown, the intermediate bearing member 20 is mounted on the base 10 for free rotation about the common axis of said bearings, and is also held from vertical lost motion.

A lug 35 (Fig. 5) projects laterally from the member 20 between stop screws 36 threaded in brackets 37 and held in adjusted position by lock nuts 38. The brackets 37 are clamped to the side of the base 10 as indicated in Fig. 4. By adjusting the screws 36, the angular movement of the member 20 relative to the base 10 may be limited as desired.

On its upper surface, the member 20 is provided with a transverse dove-tailed bar 40, engaged on both sides by a plurality of balls 41. Gibs 42 and 43 are mounted in the lower face of the head 14, the gib 42 being secured in fixed position by clamping screws 44, and the gib 43 being adjustable by screws 46 and secured by clamping screws 47.

By suitably adjusting the gib 43, the head 14 may be permitted free floating movement forward and rearward relative to the member 20, while lost motion is effectively prevented.

Stop screws 50 in projections 51 at the front and rear of the member 20 limit said forward and rearward floating movement of the head 14, said stop screws being secured by check nuts 53.

Endwise displacement of the balls 41 in the race ways provided between the bar 40 and the gibs 42 and 43 may be prevented by stop pins 55 (Fig. 3) or in any other convenient manner.

With my improved machine tool constructed as above described, it will be evident that the tap or other tool T is free to move in a horizontal plane, either forward or rearward with respect to the base 10, or angularly about the axis of the base 10. In each case, there is a free or floating movement which, however, is definitely confined between easily adjustable limits. The tap or tool thus readily centers itself with respect to a hole in the work W, and will ream or tap a straight hole of the desired diameter, even if the axis of the tap does not exactly coincide with the axis of the spindle 16.

Having thus described my invention and the advantages thereof, I do not wish to be limited to the details herein disclosed, otherwise than as set forth in the claims, but what I claim is:

1. In a machine tool having a fixed base and a fixed work support, in combination, a non-rotating spindle head, a tool spindle mounted in said spindle head for rotation about a substantially vertical axis and having a fixed locus of rotation in said spindle head, a spindle-driving motor concentric with said tool spindle, and means to movably support said spindle head on said fixed base and to provide limited free transverse movement of said spindle head on said base, said supporting means being substantially in the plane of tool operation on the work.

2. In a machine tool having a fixed base and a fixed work support, in combination, a non-rotating spindle head, a tool spindle mounted in said spindle head for rotation about a substantially vertical axis and having a fixed locus of rotation in said spindle head, a spindle-driving motor concentric with said tool spindle, means to movably support said spindle head on said fixed base and to provide limited free transverse movement of said spindle head on said base, and adjustable means to limit such transverse movement.

3. In a machine tool having a fixed base and a fixed work support, in combination, a non-rotating spindle head, a tool spindle mounted in said spindle head for rotation about a substantially vertical axis and having a fixed locus of rotation in said spindle head, a spindle-driving motor concentric with said tool spindle, means to movably support said spindle head on said fixed base and to provide limited free transverse movement of said spindle head on said base, adjustable means to limit such transverse movement, additional means providing free angular movement of said spindle head on said base, and separate adjustable means to limit said angular movement.

4. In a machine tool having a fixed base and a fixed work support, in combination, a non-rotating spindle head, a tool spindle mounted in said spindle head for rotation about a substantially vertical axis and having a fixed locus of rotation in said spindle head, a spindle-driving motor concentric with said tool spindle, means to movably support said spindle head on said fixed base, and a linear anti-friction bearing between said spindle head and said base which provides limited free forward and rearward movement of said spindle head relative to said base.

5. In a machine tool having a fixed base and a fixed work support, in combination, a non-rotating spindle head, a tool spindle mounted in said spindle head for rotation about a substantially vertical axis and having a fixed locus of rotation in said spindle head, a spindle-driving motor concentric with said tool spindle, means to movably support said spindle head on said fixed base, and a circular anti-friction bearing between said spindle head and said base which provides limited free angular movement of said spindle head relative to said base.

6. In a machine tool having a fixed base and a fixed work support, in combination, a non-rotating spindle head, a tool spindle mounted in said spindle head for rotation about a substantially vertical axis and having a fixed locus of rotation in said spindle head, a spindle-driving motor concentric with said tool spindle, means to movably support said spindle head on said fixed base, an intermediate bearing member interposed between said spindle head and said fixed base, means providing limited free, angular movement between said base and said member, and means providing free limited linear movement between said member and said spindle head.

ERNEST A. WALKER.